United States Patent
Katagai et al.

(10) Patent No.: US 9,448,781 B2
(45) Date of Patent: Sep. 20, 2016

(54) APPLICATION INSTALLER TRANSMISSION SYSTEM, SERVER, AND PROGRAM

(71) Applicant: KONAMI DIGITAL ENTERTAINMENT CO., LTD., Minato-ku, Tokyo (JP)

(72) Inventors: Tahei Katagai, Yokohama (JP); Tomoaki Koguchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 14/445,280

(22) Filed: Jul. 29, 2014

(65) Prior Publication Data

US 2014/0337831 A1     Nov. 13, 2014

Related U.S. Application Data

(63) Continuation-in-part of application No. PCT/JP2013/052164, filed on Jan. 31, 2013.

(30) Foreign Application Priority Data

Feb. 6, 2012 (JP) ................. 2012-023088

(51) Int. Cl.
    *G06F 9/445*     (2006.01)
    *H04L 29/08*     (2006.01)
    *G06Q 30/02*     (2012.01)

(52) U.S. Cl.
    CPC ............... *G06F 8/61* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,115,471 | A | 9/2000 | Oki et al. |
| 2006/0048139 | A1 | 3/2006 | Nakamura |
| 2006/0124735 | A1 | 6/2006 | Mizuno et al. |
| 2008/0077915 | A1* | 3/2008 | Kahan et al. ............... 717/178 |
| 2010/0146500 | A1* | 6/2010 | Joubert et al. ............. 717/178 |
| 2010/0245909 | A1 | 9/2010 | Yamaguchi |
| 2012/0035990 | A1* | 2/2012 | Lewis et al. .............. 705/14.1 |
| 2014/0068589 | A1* | 3/2014 | Barak ................. G06F 9/445 717/176 |

FOREIGN PATENT DOCUMENTS

| | | |
|---|---|---|
| JP | 2012-000447 A | 1/2012 |
| JP | 2012-014366 A | 1/2012 |

OTHER PUBLICATIONS

"Aion Refer a Friend Program." Aion MMORPG-Life. N.p., Dec. 18, 2009. Web. Jun. 19, 2015. <http://aion.mmorpg-life.com/aion/news/aion-refer-a-friend-program/37995/>.*

"Referral System." Wiki The-West. N.p., Oct. 25, 2011. Web. Jun. 23, 2015. <https://wiki.the-west.net/wiki/Referral_System>.*

Written Opinion (translated) for PCT/JP2013/052164 dated Feb. 26, 2013.*

* cited by examiner

Primary Examiner — Wei Zhen
Assistant Examiner — Binh Luu
(74) Attorney, Agent, or Firm — Sughrue Mion, PLLC

(57) ABSTRACT

A system includes a designation information transmitter and an application installer transmitter. The designation information transmitter is configured to transmit a designation information to a computer. The application installer transmitter is configured to transmit an application installer to the computer and includes an install function, for installing the application identified by the application identification information in the computer, and a storing function, for storing a scheme information in the computer.

18 Claims, 6 Drawing Sheets

FIG. 2

| SCHEME | LAUNCHED APPLICATION |
|---|---|
| http: | BROWSER APPLICATION |
| tel: | TELEPHONE APPLICATION |
| mailto: | e-mail APPLICATION |
| ... | ... |

FIG. 3

| SCHEME | LAUNCHED APPLICATION |
|---|---|
| http: | BROWSER APPLICATION |
| tel: | TELEPHONE APPLICATION |
| mailto: | e-mail APPLICATION |
| http://aaa.com | (APPLICATION A1) |
| ... | ... |

FIG. 4

| USER ID | PASS WORD | USER NAME | e-mail ADDRESS | ATTRIBUTE INFORMATION | ... |
|---|---|---|---|---|---|
| U1 | **** | U1@bbb | U1@bbb | ... | ... |
| ... | ... | ... | ... | ... | ... |

FIG. 5

| USER ID | FRIEND USER ID | ... |
|---|---|---|
| U1 | U3,U9 | ... |
| ... | ... | ... |

FIG. 6

| USER ID | e-mail ADDRESS OF INVITED USER | ... |
|---|---|---|
| U1 | U2@ccc | ... |
| ... | ... | ... |

FIG. 7

| USER ID | e-mail ADDRESS OF INVITED USER | INVITATION IDENTIFICATION INFORMATION | BONUS-GRANTING FLAG | ... |
|---|---|---|---|---|
| U1 | U2@ccc | 123456789 | 0 | ... |
| ... | ... | ... | ... | ... |

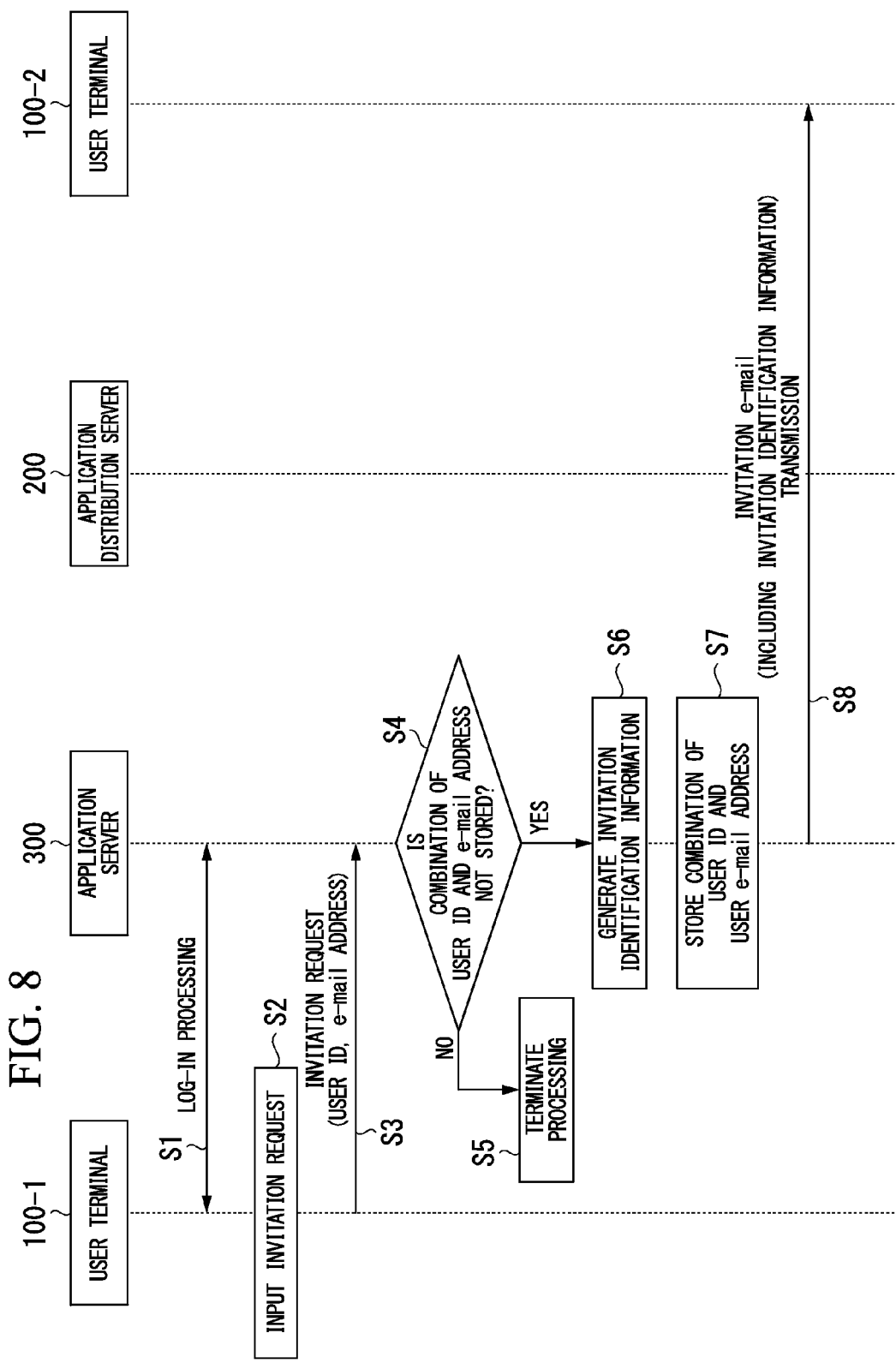

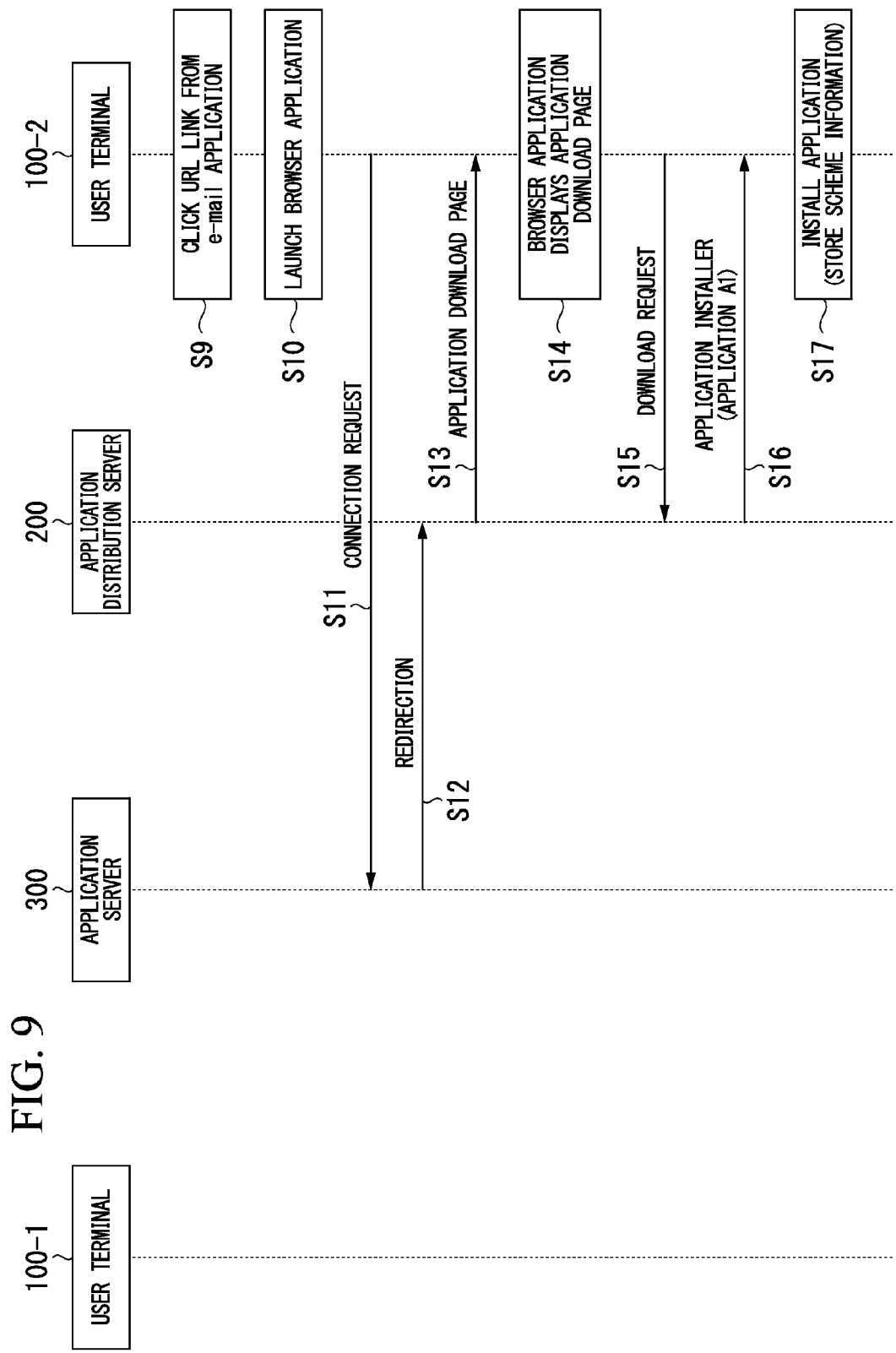

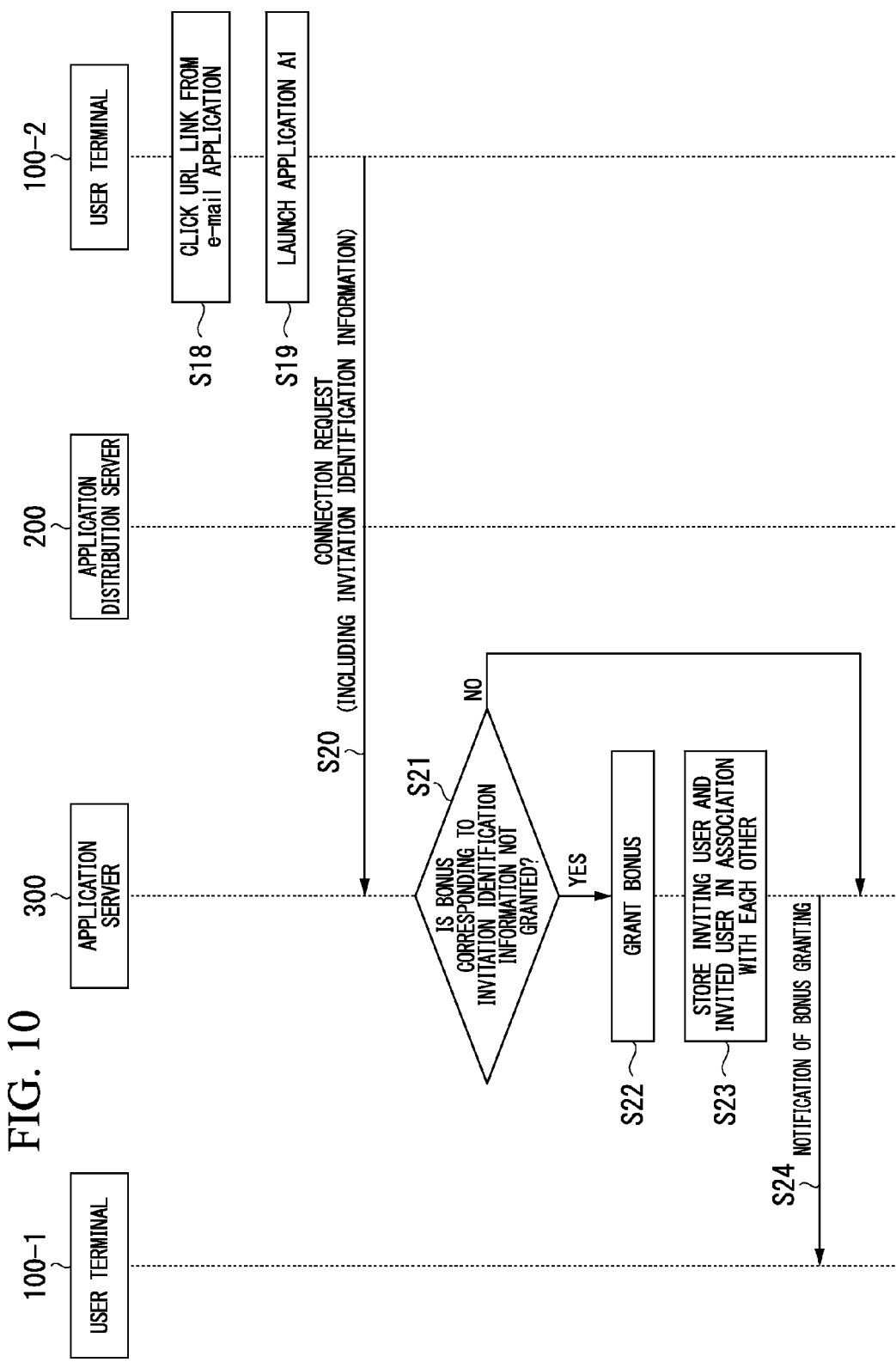

APPLICATION INSTALLER TRANSMISSION SYSTEM, SERVER, AND PROGRAM

BACKGROUND OF THE INVENTION

1. Field of the Invention

The disclosure relates to an application system, an application server, and a program.

2. Description of the Related Art

There is an application system which allows applications installed on user terminals to share information together by connecting to an application server via a network. Japanese Laid-open Patent Publication No. JPA 2012-000447 discloses a system in which a plurality of user terminals connect to a game server via a network, and a plurality of users play the same game. Such applications include applications that, via a network such as the Internet, are distributed to and operate in user terminals such as general-purpose personal computers and smartphones. In this case, an application distribution server that distributes an application, in response to an application download request received from a user terminal, transmits an application installer, and causes installation into the user terminal. In this manner, the user terminal operates the installed application, connects to the application server, and shares information with other user terminals via the application server.

SUMMARY

In an embodiment, a system may include, but is not limited to, a designation information transmitter and an application installer transmitter. The designation information transmitter may be configured to transmit a designation information to a computer. The designation information may include, but is not limited to, an application identification information and a connection destination designation information. The application identification information identifies an application. The connection destination designation information designates a connection destination from which the application identified by the application identification information is available. The application installer transmitter may be configured to transmit an application installer to the computer. The application installer may include, but is not limited to, an install function and a storing function. The install function is for installing the application identified by the application identification information in the computer. The storing function is for storing a scheme information in the computer. The scheme information is for launching the application identified by the application identification information.

BRIEF DESCRIPTION OF THE DRAWINGS

The above features and advantages of the embodiments of the present invention will be more apparent from the following descriptions of certain illustrative embodiments taken in conjunction with the accompanying drawings, in which:

FIG. 2 shows an example of scheme information data in the one or more embodiments of the invention;

FIG. 3 shows an example of updated scheme information data in the one or more embodiments of the invention;

FIG. 4 shows an example of user information data in the one or more embodiments of the invention;

FIG. 5 shows an example of user correspondence relationship information data in the one or more embodiments of the invention;

FIG. 6 shows an example of transmission destination designation information data in the one or more embodiments of the invention;

FIG. 7 shows an example of information data stored in an invitation identification information storage in the one or more embodiments of the invention;

FIG. 8 is a flow chart of the application system in the one or more embodiments of the invention;

FIG. 9 is a flow chart of the application system in the one or more embodiments of the invention; and FIG. 10 is a flow chart of the application system in the one or more embodiments of the invention.

DETAILED DESCRIPTION OF THE EMBODIMENTS

Figure 1:
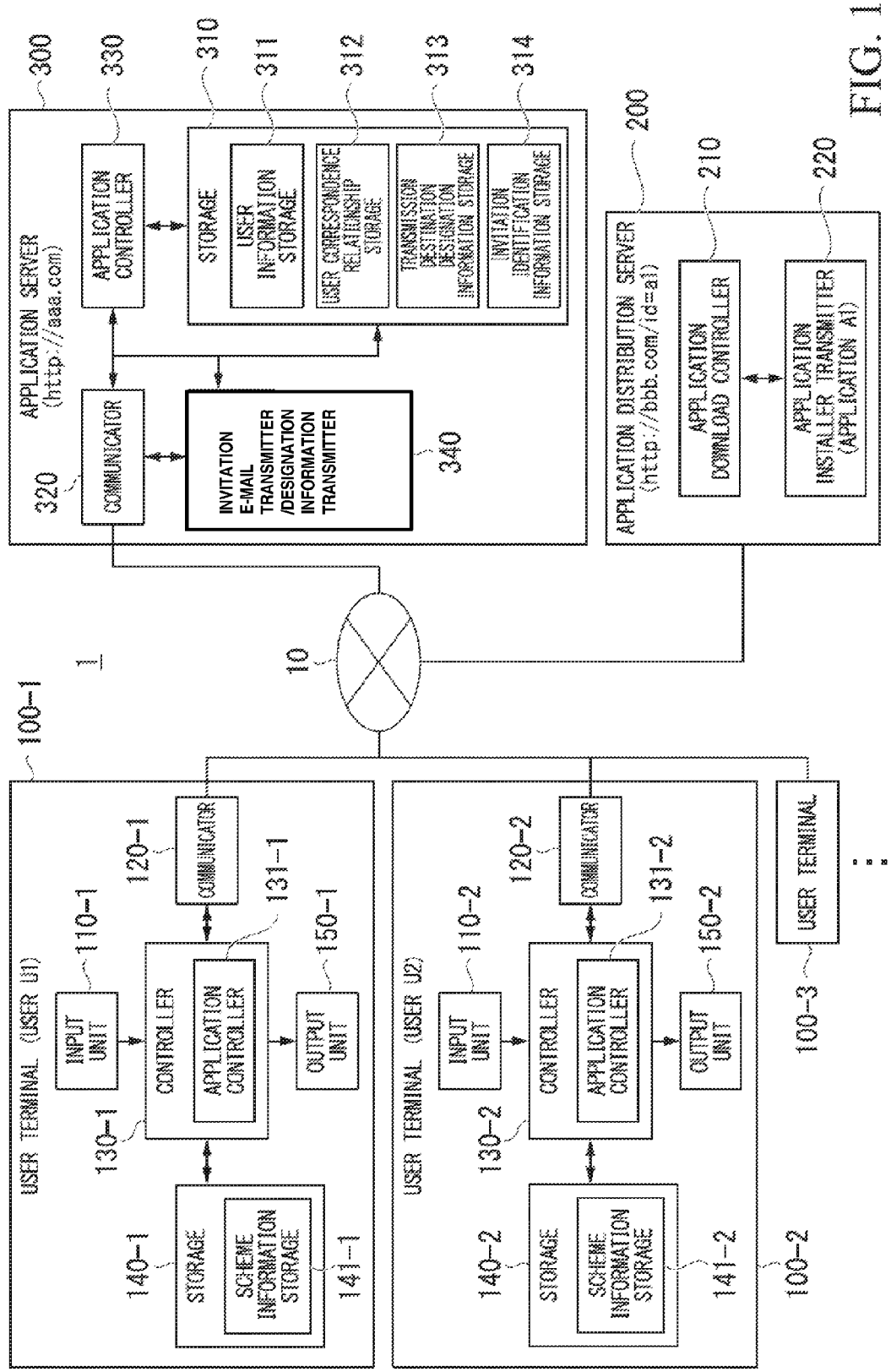
FIG. 1 is a block diagram of an application system in one or more embodiments of the invention.

Embodiments of the invention will be described herein. Those skilled in the art will recognize that many alternative embodiments can be accomplished using the teaching of the embodiments and that the invention is not limited to the embodiments illustrated for explanatory purpose.

In one embodiment, a system may include, but is not limited to, a designation information transmitter and an application installer transmitter. The designation information transmitter may be configured to transmit a designation information to a computer. The designation information may include, but is not limited to, an application identification information and a connection destination designation information. The application identification information identifies an application. The connection destination designation information designates a connection destination from which the application identified by the application identification information is available. The application installer transmitter may be configured to transmit an application installer to the computer. The application installer may include, but is not limited to, an install function and a storing function. The install function is for installing the application identified by the application identification information in the computer. The storing function is for storing a scheme information in the computer. The scheme information is for launching the application identified by the application identification information.

In some cases, the system may further include, but is not limited to, an input unit configured to receive an entry of a transmission destination designation information that designates a transmission destination to which the designation information is to be transmitted. The designation information transmitter may be configured to transmit the designation information to the transmission destination designated by the transmission destination designation information which has been entered into the input unit. In this case, the input unit may be configured as a function of the application. In this case, the input unit may also be configured to receive an entry of a user identification information that identifies a user. The designation information transmitter may be configured to transmit the user identification information and the designation information to the transmission destination.

In the last mentioned case, the system may further include, but is not limited to, an application controller configured to receive a connection request, which includes the user identification information, from the application which has been launched based on the scheme information at the transmission destination, to which the application installer transmitter had transmitted the application installer.

In the last mentioned case, the system may further include, but is not limited to, a user information storage that stores the user identification information and a user attribute information associated with the user identification information. The application controller is configured to associate a bonus with the attribute information associated with the user identification information, upon receipt of the connection request including the user identification information. The application controller is configured to store, in the user information storage, the bonus, the attribute information and the user identification information in association together with each other.

In the above mentioned case, the system may further include, but is not limited to, a user correspondence relationship storage that stores a first user identification information and a second user identification information in association with each other. The first user identification information is for identifying a user. The second user identification information is for identifying another user. The application controller is configured to create, upon receipt of the connection request including the first user identification information, the second user identification information associated with the transmission destination, from the application launched based on the scheme information at the transmission destination, to which the application installer transmitter had transmitted the application installer. The application controller is configured to store the first user identification information and the second user identification information in association with each other in the user correspondence relationship storage.

In the above mentioned case, the system may further include, but is not limited to, a user correspondence relationship storage that stores a first user identification information and a second user identification information in association with each other. The first user identification information is for identifying a user. The second user identification information is for identifying another user. The application controller is configured to create, upon receipt of the connection request including the first user identification information, the second user identification information associated with the transmission destination, from the application launched based on the scheme information at the transmission destination, to which the application installer transmitter had transmitted the application installer. The application controller is configured to store the first user identification information and the second user identification information in association with each other in the user correspondence relationship storage.

In the above mentioned cases, the system may further include, but is not limited to, a transmission destination designation information storage that stores the user identification information and the transmission destination designation information in association with each other. The designation information transmitter is configured to transmit the designation information in a case that the designation information transmitter recognizes that the user identification entered into the input unit and the transmission designation information are stored in association with each other in the transmission destination designation information storage.

In the above mentioned case, the system may further include, but is not limited to, an invitation identification information storage that stores the user identification information and an invitation identification information in association with each other. The invitation identification information indicates that the designation information transmitter has transmitted the designation information to a transmission destination designated by the transmission destination designation information. The designation information transmitter is configured to create, upon entry of the transmission destination designation information into the input unit, the invitation identification information indicating that the designation information transmitter has transmitted the connection destination designation information to a transmission destination designated by the transmission destination designation information. The designation information transmitter is configured to transmit the invitation identification information and the connection designation information to the transmission destination designated by the transmission destination designation information. The application controller is configured to associate a bonus with the attribute information associated with the user identification information associated with the invitation identification information, upon receipt of the connection request including the invitation identification information, unless the invitation identification information is stored in the invitation identification information storage.

In another embodiment, a server may include, but is not limited to, a designation information transmitter and an application installer transmitter. The designation information transmitter may be configured to transmit a designation information to a computer. The designation information may include, but is not limited to, an application identification information and a connection destination designation information. The application identification information identifies an application. The connection destination designation information designates a connection destination from which the application identified by the application identification information is available. The application installer transmitter may be configured to transmit an application installer to the computer. The application installer may include, but is not limited to, an install function and a storing function. The install function is for installing the application identified by the application identification information in the computer. The storing function is for storing a scheme information in the computer. The scheme information is for launching the application identified by the application identification information.

In still another embodiment, a server may include, but is not limited to, an application installer transmitter configured to transmit an application installer to the computer. The application installer may include, but is not limited to, an install function and a storing function. The install function is for installing an application in the computer. The application is identified by an application identification information and is available from a connection destination designated by a connection destination designation information associated with the application identification information. The storing function is for storing a scheme information in the computer. The scheme information is for launching the application identified by the application identification information.

In yet another embodiment, a non-transitory computer-readable storage medium that stores a program, when executed by a computer, to cause the computer to perform a method may include, but is not limited to, the following processes. A designation information is transmitted to another computer. The designation information may include, but is not limited to, an application identification information and a connection destination designation information. The application identification information identifies an application. The connection destination designation information designates a connection destination from which the application identified by the application identification information is available. An application installer is transmitted to the other computer. The application installer may include, but is not limited to, an install function and a storing function. The install function is for installing the application identified by the application identification information in the computer. The storing function is for storing a scheme information in the computer. The scheme information is for launching the application identified by the application identification information.

In a furthermore embodiment, an application installer program product may include, but is not limited to, an install code and a storing code. The install code is for installing an application in a computer. The application is identified by an application identification information and is available from a connection destination designated by a connection destination designation information associated with the application identification information. The storing code is for storing a scheme information in the computer. The scheme information is for launching the application identified by the application identification information.

In moreover embodiment, a method may include, but is not limited to, the following processes. A designation information is transmitted to a computer. The designation information may include, but is not limited to, an application identification information and a connection destination designation information. The application identification information identifies an application. The connection destination designation information designates a connection destination from which the application identified by the application identification information is available. An application installer is transmitted to the computer. The application installer may include, but is not limited to, an install function and a storing function. The install function is for installing the application identified by the application identification information in the computer. The storing function is for storing a scheme information in the computer. The scheme information is for launching the application identified by the application identification information.

In an additional embodiment, a method may include, but is not limited to, the following processes. An application installer is transmitted to a computer. The application installer may include, but is not limited to, an install function and a storing function. The install function is for installing an application which is identified by an application identification information in the computer and which is available from a connection destination designated by a connection destination designation information associated with the application identification information. The storing function is for storing a scheme information in the computer. The scheme information is for launching the application identified by the application identification information.

In a further additional embodiment, a method may include, but is not limited to, the following processes. An application is installed in a computer. The application is identified by an application identification information and is available from a connection destination designated by a connection destination designation information associated with the application identification information. A scheme information is stored in the computer. The scheme information is for launching the application identified by the application identification information.

In a further embodiment, a server may include, but is not limited to, a designation information transmitter configured to transmit a designation information to a computer. The designation information may include, but is not limited to, an application identification information and a connection destination designation information. The application identification information identifies an application. The connection destination designation information designates a transmission destination to which an application installer is transmitted. The application installer may include, but is not limited to, an install function and a storing function. The install function is for installing the application which is identified by the application identification information in the computer. The storing function is for storing a scheme information in the computer. The scheme information is for launching the application identified by the application identification information.

In a still further embodiment, a non-transitory computer-readable storage medium that stores a program, when executed by a computer, to cause the computer to perform a method may include, but is not limited to, the following process. A designation information is transmitted to another computer. The designation information may include, but is not limited to, an application identification information and a connection destination designation information. The application identification information identifies an application. The connection destination designation information designates a transmission destination to which an application installer is transmitted. The application installer may include, but is not limited to, an install function and a storing function. The install function is for installing the application which is identified by the application identification information in the other computer. The storing function is for storing a scheme information in the other computer. The scheme information is for launching the application identified by the application identification information.

In a still further embodiment, a method may include, but is not limited to, the following process. A designation information is transmitted to a computer. The designation information may include, but is not limited to, an application identification information and a connection destination designation information. The application identification information identifies an application. The connection destination designation information designates a transmission destination to which an application installer is transmitted. The application installer may include, but is not limited to, an install function and a storing function. The install function is for installing the application which is identified by the application identification information in the computer. The storing function is for storing a scheme information in the computer. The scheme information is for launching the application identified by the application identification information.

FIG. 1 is a block diagram showing the configuration of an application system 1 according to the present embodiment. The application system 1 includes a user terminal 100-1, a user terminal 100-2, a user terminal 100-3, an application distribution server 200, and an application server 300, which can be implemented using computers connectable via a network 10. Because the user terminal 100-1, the user terminal 100-2, and the user terminal 100-3 have the same configurations, unless particularly distinguished, these will be described as the user terminal 100, with the notation of -1, -2, and the like omitted. Although the illustration and description in this case are for three user terminals 100, the number of user terminals 100 connectable to the network 10 should not be limited.

The user terminal 100 can be implemented using a computer used by a user, and this can be, for example, a PC (personal computer), a tablet personal computer, a smartphone, or a feature phone or the like. In the present embodiment, the user terminal 100 is described as being a smartphone. In this case, the user terminal 100-1 has pre-installed therein an application distributed by the application distribution server 200, and the user terminal 100-2 does not have pre-installed therein an application distributed by the application distribution server 200. The user of the user terminal 100-1 is a user U1, having an e-mail address U1@bbb. The user of the user terminal 100-2 is a user U2, having an e-mail address U2@ccc. In the present embodiment, the example is described in which, in response to instruction information input to the user terminal 100-1 by the user U1, an application invitation e-mail is transmitted to the user terminal 100-2 of the user U2, in which the application is not installed, and the application is installed into the user terminal 100-2.

The user terminal 100 includes an input unit 110, a communicator 120, a controller 130, a storage 140, and an output unit 150.

The input unit 110 has an input unit, such as a button or a touch panel, and accepts input from the user. For example, the input unit 110 accepts input of instruction information regarding an application that will run on the user terminal 100. The input unit 110 also accepts input of an e-mail address that is the transmission destination designation information designating the transmission destination for transmission of an invitation e-mail by the user. The body of the invitation e-mail includes connection designation information. The connection designation information is a URL (uniform resource locator), which is information designated for connecting to the connection target, and includes, to make connecting to the connection target, application identification information identifying the application to be used and connection destination identification information identifying the connection destination of the connection target. In the present embodiment, the connection designation information (URL) of the application server 300 is taken to be "http://aaa.com". The connection designation information "http://aaa.com" in this case includes the identification information "http:", which identifies the browser application, which is an application used to make connection to the application server 300, and the identification information "//aaa.com", which identifies the connection destination of the application server 300, which is the connection target.

The e-mail address designating the transmission destination for transmitting the invitation e-mail is the e-mail address of the invited user who is to receive the invitation. For example, if the user U1 using the user terminal 100-1 is to invite the user U2 using the user terminal 100-2, the user U1 designates the e-mail address U2@ccc of the user U2 as the transmission destination. In this case, for example, if an e-mail is transmitted with the e-mail address of the user U2 as the addressee, the e-mail is transmitted to and stored in the e-mail server corresponding to the e-mail address that is the addressee. The user U2 can operate an user terminal 100 to read out the e-mail stored in the e-mail server to the user terminal 100. In the present embodiment, the description is for the case of the user U2 operating the user terminal 100-2 to read out an e-mail, and the e-mail having the e-mail address of the user U2 as the addressee being transmitted to the user terminal 100-2.

If the user operates the user terminal 100 to transmit an invitation e-mail, the controller 130 reads out the e-mail addresses included in the address book stored in the storage 140, and displays a listing of the read-out e-mail addresses on the output unit 150, which is a display. The input unit 110 accepts input from the user to select the e-mail address of the user to be invited from the listing of e-mail addresses displayed in this manner on the output unit 150. When the user terminal 100 communicates with the application server 300 and the user logs into an application service provided by the application server 300, the input unit 110 accepts input from the user of a user ID (identifier) and a password or the like, which includes user account information.

The communicator 120 communicates with other computers connected via the network 10.

The controller 130 executes a program read out from the storage 140, and controls the various parts of the user terminal 100. For example, the controller 130 reads out and executes an OS (operating system) program and an application program that runs in the operating system that are stored in the storage 140. The controller 130 has an application controller 131.

The application controller 131 reads out an application program stored in the storage 140 and runs an application based on the read-out application program. The application controller 131, for example, runs a browser application, a telephone application, an e-mail application, or an installed application that was downloaded from the application distribution server 200. In the present embodiment, in order to distinguish with respect to other applications, an application downloaded from the application distribution server 200 and installed will be called the application A1.

The storage 140 stores various information used for operating the user terminal 100. For example, the storage 140 stores an operating system program and application programs that run on the operating system.

In this case, the storage 140-2 of the user terminal 100-2 includes a scheme information storage 141-2 storing scheme information. FIG. 2 is a table showing an example of the data of the scheme information stored in the scheme information storage 141-2. Scheme information is a scheme designated by application identification information and information that defines the correspondence relationship to an application used (launched) in accordance with the scheme. For example, the browser application is associated with the scheme "http:". In this case, if a URL starting with "http:" is designated in an application running in the user terminal 100-2, the browser application associated with the scheme "http:" will launch and the launched browser application communicates to connect to a connection destination designated as the connection destination identification information following the scheme "http:". In this case, although the storage 140-2 of the user terminal 100-2 is shown as having the scheme information storage 141-2, the user terminal 100-1 may have the same type of configuration and functionality based on the URL scheme in the same manner.

The output unit 150 can be implemented using a display configured to display images and/or a speaker configured to generate sound, or any device configured to output various types of information.

The application distribution server 200 can be implemented using a computer connectable to the user terminal 100 via the network 10. The application distribution server 200 includes an application download controller 210 and an application installer transmitter 220.

The application distribution server 200 pre-stores in its own storage area an application installer having an application that is to be installed in a computer such as the user terminal 100. The application distribution server 200 has a web server function, and the application download controller 210, in response to a connection request from a user terminal 100, transmits an application download page, which is a webpage that accepts a download request for an application stored in its own storage area.

For example, the URL of an application download page for a download request for application A1 accepted by the download controller 210 is http://bbb.com/id=a1, and the application download controller 210, in response to the transmission of an invitation e-mail including the URL "http://aaa.com" to the user terminal 100-2 by the invitation e-mail transmitter 340 of the application server 300, which will be described later, receives a connection request redirected by the application server 300 that was transmitted from the user terminal 100-2. The application download controller 210, in response to the received connection request, transmits the application download page for the application A1 to the user terminal 100-2. In response to the transmitted application download page, the application download controller 210 receives a download request transmitted from the transmission destination.

The application installer transmitter 220, in response to the application download request transmitted from the user terminal 100, transmits the application installer.

The application installer transmitter 220 reads out of a storage in the application distribution server 200 an application installer having an application requested by a download request received by the download controller 210 from the user terminal 100, and transmits the application installer to the user terminal 100, which was the transmission origin of the download request. In this case, the application installer transmitted by the application installer transmitter 220 includes processing to install that application into the user terminal 100 and processing to store scheme information defining the launching of the application into the user terminal 100, based on the prescribed scheme designated by the application identification information.

When the application installer transmitted by the application installer transmitter 220 is executed by the user terminal 100, in addition to the application being installed into the user terminal 100, scheme information defining the launching of the application A1 based on a scheme designated by application identification information identifying the application A1 is stored into scheme information storage 141 of the user terminal 100. FIG. 3 is a table showing an example of the data of the scheme information stored in the scheme information storage 141 of the user terminal 100. In this table, the scheme "http://aaa.com" as the application identification information identifying an application A1 and the "application A1" as the application to be launched in accordance with the scheme are associated with each other, added in the fourth line, and stored.

The application server 300 can be implemented using a computer that provides an application service with respect to an application running in the user terminal 100 by communicating with the user terminal 100 to which it is connected via the network 10. In the present embodiment, the application server 300 provides an application service by which user terminals of a plurality of users can share information via the network 10. The application service provided by the application server 300 can be, for example, a network game service enabling a plurality of users to play and socially interact, an information sharing service in which a plurality of users share information such as text or images via the network 10, or a client application service of an online storage service. Alternatively, it may be, for example, a service that provides a browser application or an e-mail application. The application server 300 has a storage 310, a communicator 320, an application controller 330, and an invitation e-mail transmitter 340.

The storage 310 stores various information used to provide an application service. The storage 310 has a user information storage 311, a user correspondence relationship storage 312, a transmission destination designation information storage 313, and an invitation identification information storage 314.

The user information storage 311 stores user information. A user ID that is user identification information identifying a user who will use an application service provided by the application server 300 is stored, in association with attribute information indicating the attributes of that user. For example, FIG. 4 shows an example of data of the user information stored in the user information storage 311. The user information includes, for example, information of a user ID, a password, a user name, an e-mail address, and attribute-information. The user ID identifies a user who uses an application service. The password is a password of the corresponding user. Log-in processing for a user is performed based on the account information, which is the combination of the user ID and the password. The user name is the name of that user, which is, for example, the account name of the user using the application service. The e-mail address is the e-mail address of that user. The attribute information is information regarding the user who uses an application and is, for example in the case of a game application, information such as the character (avatar) image corresponding to that user, the level and ability value such as strength, and the items held by that character in the game. In contrast, in the case of an online storage application, this is information such as the online storage data capacity that the user is permitted to use.

The user correspondence relationship storage 312 stores user correspondence relationship information. A first user ID identifying a user and a second user ID identifying another user with respect to that user are stored in association with each other to establish correspondence relationship between users using an application service provided by the application server 300. For example, users who are associated with each other in the user correspondence relationship information are treated as friend users in an application service, and control is done so that information is shared between friend users. FIG. 5 is a table showing an example of data of the user correspondence relationship information stored in the user correspondence relationship storage 312.

In this case, U3 and U9, which are second user IDs (friend user IDs) are associated with U1, which is the first user ID.

The transmission destination designation information storage 313 stores the e-mail address of a user to be invited, which is entered to the input unit 110 of the user terminal 100 and received by the communicator 320 of the application server 300, and a user ID of the user who input that e-mail address, in association with each other. FIG. 6 is a table showing an example of data of the information stored in the transmission destination designation information storage 313.

The invitation identification information storage 314 stores invitation identification information which identifies the transmission of an invitation e-mail for an application addressed to an e-mail address of an invited user as the transmission destination. FIG. 7 is a table showing an example of the data of the information stored in the invitation identification information storage 314. In the invitation identification information storage 314, user IDs, the e-mail addresses of invited users, invitation identification information, and bonus-granting flags are stored in association with each other. The user ID is information identifying an inviting user who has transmitted an invitation e-mail. The invited user e-mail address is the e-mail address of an invited user to whom an invitation e-mail has been transmitted based on an invitation request from the corresponding inviting user.

The invitation identification information identifies that an invitation e-mail was transmitted from an inviting user to an invited user. The bonus-granting flag indicates whether or not a bonus has been granted to an inviting user in response to the inviting user inviting an invited user. For example, if the bonus-granting flag is 0, this would indicate that a bonus has not been granted, and if the bonus-granting flag is 1, this would indicate that a bonus has been granted. The initial value of the bonus-granting flag is 0.

The communicator 320 communicates with other computers connected via the network 10.

The application controller 330 communicates via the network 10 with a user terminal 100 into which an application has been installed, and provides an application service with respect to the application running in the user terminal 100. For example, the application controller 330 provides an application service with respect to the application A1 launched based on scheme information in a user terminal 100-2 that is a transmission destination for transmission of an application installer by the application installer transmitter 220 of the application distribution server 200. When the application A1 is launched in the user terminal 100-2, the application A1 transmits a connection request to the application controller 330 via the application controller 131-2.

Upon receiving the connection request, the application controller 330 generates a user ID of the invited user corresponding to the transmission destination of the application installer, generates and stores in the user information storage 311 user information of the invited user, and issues a user account. The application controller 330 also stores the user ID of the inviting user and the user ID of the invited user in the user correspondence relationship storage 312, in association with each other. In this case, the connection request received by the application controller 330 from the user terminal 100-2 of the invited user includes invitation identification information identifying the transmission of an invitation e-mail from the inviting user with the e-mail address of the invited user as the transmission destination. Upon receiving this connection request, the application controller 330, based on whether or not invitation identification information included in the connection request is stored in the invitation identification information storage 314, grants a bonus to the inviting user identified by the user ID associated with the invitation identification information. A bonus is appended and stored into the attribute information corresponding to the user ID of the inviting user in the user information stored in the user information storage 311. For example, in the case of a game application, some item or points or the like may be granted or an ability value may be increased, and in the case of online storage, the data capacity threshold may be increased. The application controller 330 may grant a bonus not only to the inviting user, but also to the invited user.

Upon accepting a connection request including invitation identification information, the application controller 330 determines whether or not that invitation identification information is stored in the invitation identification information storage 314. If that invitation identification information is not stored in the invitation identification information storage 314, the application controller 330 appends a bonus to the attribute information corresponding to the user ID of the inviting user associated with the invitation identification information, and updates the bonus-granting flag to 1. If that invitation identification information is stored in the invitation identification information storage 314, a bonus is not appended to the attribute information corresponding to the user ID of the inviting user associated with the invitation identification information. This makes it possible to grant a bonus only one time, based on an invitation e-mail from one particular user to another particular user. For example, this prevents the granting of a bonus a plurality of times to an inviting user when a plurality of user accounts are created in response to one invitation e-mail, or when one user transmits the same invitation e-mail to a plurality of e-mail addresses.

The invitation e-mail transmitter 340 receives the e-mail address of an invited user input to the input unit 110 of the user terminal 100 of the inviting user and transmits an invitation e-mail, in the body of which is included connection designation information with that e-mail address as the transmission destination. That is, the invitation e-mail transmitter 340 has a function of a connection designation information transmitter transmitting connection designation information designated for connecting to a prescribed connection target. In this case, the invitation e-mail transmitter 340 pre-stores the format of the body of the invitation e-mail into its own storage area. The format of the body of the invitation e-mail includes, for example, text such as "(inviting user) has invited you to application A1. To install application A1 and accept the invitation, click here->http://aaa.com", and an invitation e-mail is generated with the user name of the inviting user replacing the "inviting user" location. In this case, the URL http://aaa.com as the connection designation information included in the e-mail body appears as a URL link when displayed by the e-mail application.

In this case, the invitation e-mail transmitter 340 transmits an invitation e-mail, based on whether or not the e-mail address of the invited user received from the user terminal 100 is stored in the transmission destination designation information storage 313 in association with the user ID of the inviting user. If the e-mail address of the invited user and the user ID of the inviting user that are received from the user terminal 100 are determined to be stored in association with each other in the transmission destination designation information storage 313, the invitation e-mail transmitter 340 does not transmit the invitation e-mail. If the determination is made that the e-mail address of the invited user and the user ID of the inviting user that are received from user terminal 100 are not stored in the transmission destination designation information storage 313 in association with each other, the invitation e-mail is transmitted. The e-mail address of the invited user and the user ID of the inviting unit are stored in the transmission destination designation information storage 313 in association with each other. This enables prevention of transmission of a plurality of invitation e-mails from the same inviting user to the same invited user.

When the communicator 320 receives an e-mail address of an invited user from the user terminal 100, the invitation e-mail transmitter 340 generates an invitation identification information identifying the transmission of the invitation e-mail, with the e-mail address of the invited user as the transmission destination. The invitation e-mail transmitter 340 calculates a hash value based on the combination of the user ID of the inviting user and the e-mail address of the invited user, and generates the calculated hash value as invitation identification information. This type of invitation identification information will identify the transmission of the invitation e-mail by the inviting user to the e-mail address of the invited user. The invitation e-mail transmitter 340 transmits the invitation e-mail in which the generated invitation identification information is included, with the invited user e-mail address as the transmission destination.

Referring to the drawings, an example of a series of operations of the application system 1 according to the present embodiment will be described. FIG. 8 to FIG. 10 are drawings showing an example of a series of operations of the application system 1 according to the present embodiment.

FIG. 8 shows an example of the operation of the application system 1 from step S1 to step S8. In this case, the assumption is that application A1 is pre-installed into the user terminal 100-1, and that the application A1 is not installed into the user terminal 100-2. The application installer for the application A1 is pre-stored in the application distribution server 200. The application server 300 provides application service of the application A1.

The application controller 131-1 of the user terminal 100-1 launches the application A1 in response to instruction information input from the user U1. The input unit 110-1 of the user terminal 100-1 accepts input of account information such as a user ID and password for the purpose of logging into the application server 300. The application controller 131-1 transmits the account information input to the user terminal 100-1 to the application server 300, via the communicator 120-1.

When the communicator 320 of the application server 300 receives the account information transmitted from the user terminal 100-1, the application controller 330 determines whether or not information identical with the received account information is stored in the user information storage 311. If the application controller 330 determines that information identical with the received account information is not stored in the user information storage 311, the processing is terminated as a log-in failure. If the application controller 330 determines that information identical with the received account information is stored in the user information storage 311, the application controller 330 determines that the log-in has succeeded and permits connection to the user terminal 100-1 (step S1). Although in this case the example shown is one in which account information is entered to the user terminal 100-1 from a user, the user terminal 100-1 alternatively may store the account information input on the first time in its own storage area, read out the account information stored in its own storage area on the second and subsequent log-ins, and perform automatic log-in processing.

The input unit 110-1 of the user terminal 100-1 accepts input of the e-mail address of an invited user from the user U1 (step S2). The e-mail address of the invited user selected by the user U1 from the e-mail addresses displayed on the output unit 150-1 based on the address book read by the controller 130-1 of the user terminal 100-1 from the storage 140-1 is accepted. In this case, the input unit 110-1 of the user terminal 100-1, in which the application A1 is installed, is configured as a function of the application A1 that accepts input of an e-mail address of an invited user. This enables the user of the user terminal 100-1, in which the application A1 is already installed, to easily invite other users.

The application controller 131-1 transmits (step S3) to the application server 300 an invitation request including the user ID input at step S1 and the invited user's e-mail address input at step S2. The communicator 320 of the application server 300 receives the invitation request transmitted from the user terminal 100-1.

The application controller 330 determines whether or not the combination of the user ID and the invited user's e-mail address included in the invitation request received by the communicator 320 is stored in the transmission destination designation information storage 313 (step S4).

If the application controller 330 determines that the combination of the inviting user's ID and the invited user's e-mail address included in the invitation request is stored in the transmission destination designation information storage 313 (NO at step S4), subsequent processing is not done, and the above-described series of steps are terminated. However, if the determination is made that the combination of the inviting user's ID and the invited user's e-mail address included in the invitation request is not stored in the transmission destination designation information storage 313 (YES at step S4), the application controller 330 generates invitation identification information (step S6). The application controller 330 also stores the combination of the inviting user's ID and the invited user's e-mail address in the transmission destination designation information storage 313 (step S7). The application controller 330 of the application server 300 generates an invitation e-mail including the invitation identification information generated at step S6, and transmits it to the user terminal 100-2 indicated by the e-mail address of the invited user via the communicator 320 (step S8).

FIG. 9 shows an example of the operation of the application system 1 from step S9 to step S17. When the communicator 120-1 of the user terminal 100-2 receives an invitation e-mail transmitted from the application server 300, the controller 130-2 controls the e-mail application so that the invitation e-mail, the body of which includes the connection designation information (URL), is displayed on the output unit 150-2. When the user U2 inputs instruction information by clicking a URL is clicked at the user terminal 100-2 (step S9), the controller 130-2 references the scheme information stored in the scheme information storage 141-2, and launches the browser application, which is the application corresponding to the scheme included in the clicked URL (step S10). The browser application transmits a connection request to the connection destination identified by the connection destination identification information included in the URL (step S11).

Upon receiving the connection request transmitted from the user terminal 100-2, the application controller 330 of the application server 300 redirects the connection request to the application distribution server 200 (step S12). In this case, the redirect destination is the application download page at the application distribution server 200 accepting a download request for the application A1, this being indicated by the URL http://bbb.com/id=1. The application controller 330 pre-stores the URL of this redirect destination into its own storage area and, based on receiving the connection request by the URL http://aaa.com, performs control to redirect to the stored URL.

In response to the connection request redirected from the application server 300, the application download controller 210 of the application distribution server 200 transmits the application download page for the application A1 to the user terminal 100-2 (step S13). The browser application of the user terminal 100-2 displays on the output unit 150-2 the application download page transmitted from the application distribution server 200 (step S14).

In response to instruction information input from the user U2, the user terminal 100-2 transmits an application download request to the application distribution server 200 (step S15). In response to the download request transmitted from the user terminal 100-2, the application installer transmitter 220 of the application distribution server 200 transmits the application installer for the application A1 to the user terminal 100-2 (step S16). Upon the communicator 320 of the user terminal 100-2 receiving the application installer transmitted from the application distribution server 200, the controller 130-2 of the user terminal 100-2 executes the application installer (step S17). This installs the application A1 into the user terminal 100-2, and stores in the scheme information storage 141-2 scheme information associated with the application "application A1" to be launched with respect to the scheme "http://aaa.com".

FIG. 10 shows an example of the operation of the application system 1 from step S18 to step S24. When the URL included in the body of the invitation e-mail displayed on the output unit 150-2 by the e-mail application of the user terminal 100-2 is clicked again, the application controller 131-2 references the scheme information stored in the scheme information storage 141-2 and launches the application A1 installed at step S17, which is the application to be launched corresponding to the scheme included in the clicked URL (step S19). The application A1, which operates based on the application controller 131-1, transmits to the application server 300 a connection request including the invitation identification information in the invitation e-mail received from the application server 300 at step S8, with the connection destination information included in the clicked URL as the connection destination (step S20).

In this manner, when the URL included in the body of the invitation e-mail is clicked at step S9, and when the same URL is clicked at step S18 with respect to launching the browser application, because scheme information is added to the scheme information storage 141-2 at step S17, the application A1 is launched. Even if the user of the user terminal 100-2 does not know how to launch the application A1 installed at step S17, it enables the user to easily launch the application A1 by clicking the URL included in the invitation e-mail once again.

When the communicator 120-1 of the application server 300 receives connection request transmitted from the user terminal 100-2, the application controller 330 reads the bonus-granting flag stored in the invitation identification information storage 314 in association with the invitation identification information included in the connection request. If the application controller 330 determines that the read-out bonus-granting flag indicates that a bonus has not been granted (YES at step S21), a bonus is appended to the attribute information of the user information stored in the user information storage 311 in association with the user ID of the inviting user corresponding to the invitation identification information, and the attribute information with the bonus is stored (step S22). The application controller 330 generates a user ID for the invited user, generates user information for the invited user, stores these in the user information storage 311 and creates a user account for the invited user. The application controller 330 also causes the user correspondence relationship storage 312 to store the inviting user's user ID and the invited user's information, in association with each other (step S23).

Then, the application server 300 notifies the user terminal 100-1 of the user U1, who is the inviting user, that a bonus has been granted (step S24). This can be done, for example, by notifying that a bonus has been granted by transmitting an e-mail to the user U1, or by notifying the granting of the bonus by causing display on the output unit 150-2 of the user terminal 100-1 when the application A1 is launched on the user terminal 100-1. If, however, at step S21 the application controller 330 determines that the read-out bonus-granting flag indicates that a bonus had been granted (NO at step S21), the processing to grant a bonus is not done.

As described above, in the present embodiment, by the user U1 inputting to the user terminal 100-1 the e-mail address of an invited user, it is easy to invite the user U2 of the user terminal 100-2 to an application. Also, because a bonus is granted to the inviting user when the invited user installs the application and makes connection to the application server 300, the inviting user is given an incentive to invite the invited user. Additionally, based on an application installed in this manner, communication between the user terminal 100-1 and the user terminal 100-2 is available, thereby enabling sharing of information between the users U1 and U2.

Also, by clicking the URL in the invitation e-mail displayed on the user terminal 100-2, the user U2 can download the application and launch the installed application. For this reason, even if the user U2 does not know how to obtain the application, by clicking the URL in the invitation e-mail, it is possible to obtain (download and install) the application. Furthermore, if the user U2 does not know how to launch the newly installed application, by clicking on the same URL, it is possible to launch and use the application. Because it is possible in this manner for the user U2 to easily install and launch an application, it is possible to increase the opportunities to grant bonuses to the user U1.

In the standpoints of the provider of the application A1, the user U1 can invite the user U2 to the application, thereby making it possible to have more users use the application A1.

Also, conventionally in a social application or the like operating using, for example, the functionality of an SNS (social networking service) or the like, when one user invites another user, other users have generally been invited using the message function or the like of the SNS. In contrast, the present embodiment enables invitation of another user without relying on the message function or the like of an SNS.

The present embodiment has the configuration that prevents a bonus from being granted multiple times by a single invitation e-mail, by including invitation identification information in the invitation e-mail transmitted to the user terminal 100-2 from the application server 300. However, if there is no need to prevent a single invitation e-mail from causing a plurality of bonuses to be granted, the invitation identification information may be omitted from the invitation e-mail. Alternatively, rather than the invitation identification information, only the user ID of the inviting user may be included, thereby identifying only the inviting user. In this case, the application controller 330 of the application server 300 receives a connection request including the inviting user's ID from the application launched based on the scheme information at the transmission destination to which the application installer transmitter 220 of the application distribution server 200 transmitted the application installer.

In this case, upon receiving a connection request including the user ID of the inviting user from the user terminal 100-2 of the invited user, the application controller 330 appends a bonus to the attribute information associated with that user ID and stores it in the user information storage 311. That is, the invitation e-mail transmitted at step S8 includes the inviting user's ID, and the connection request transmitted at step S20 includes the inviting user's ID. Doing this enables the identification of the inviting user who is the originator of the connection request when the application server 300 receives a connection request from the user terminal 100-2.

The present embodiment shows an example in which the user terminal 100-1 transmits a connection request to the application server 300 and, in response, the application server 300 transmits an invitation e-mail to the user terminal 100-2. However, the body of the invitation e-mail can be stored beforehand in the application program stored in the storage 140-1 of the user terminal 100-1 and can be transmitted directly to the user terminal 100-2 from the user terminal 100-1, without passing through the application server 300.

In the present embodiment, although the e-mail address of an invited user input from a user to the input unit 110 of the user terminal 100 is taken to be transmission destination designation information, the transmission destination designation information may be a user ID of an invited user included in, for example, another SNS application installed in that user terminal 100. For example, if a user allows linking between the application A1 and another SNS application beforehand, the input unit 110 reads out the user IDs of friend users in that SNS application, displays a list of friend user IDs on the output unit 150, and accepts a selection of the user ID of an invited user from the displayed list. In this case, for example, the message function within the SNS application can be used to send an invitation e-mail (invitation message) to the invited user.

In the present embodiment, although the description was for the case of the user U1, who is the inviting user, and the user U2, who is the invited user, being separate users, the inviting user and the invited user may be the same user. For example, for a user who uses a plurality of user terminals 100, such as a home PC, a tablet PC, and a smartphone or the like, to use a single online storage service, there are cases in which it is desirable to use the same application from a plurality of user terminals 100. If this is the case, for example, after installing the application A1 into the home PC and launching the application A1, the user transmits an invitation e-mail with the invited user e-mail address as an e-mail address that can be referenced from a tablet PC, smartphone, or the like. This enables simple installation of the application into a plurality of the user's own user terminals 100.

A program for implementing the functionality of the processing units in the present embodiment may be stored in a computer-readable recording medium, a computer system being made to read out and execute the program stored in the recording medium, so as to perform the processing of the various units of the application system 1. The term "computer system" includes an operating system and hardware such as peripheral devices. The term "computer system" also includes a WWW system having a webpage-providing environment (or webpage-displaying environment). The term "computer-readable recording medium" refers to a removable medium such as a flexible disk, an optomagnetic disk, a ROM, a CD-ROM, or the like, or a storage device such as a hard disk drive or the like built into a computer system. Additionally, the term "computer-readable recording medium" encompasses one holding a program for a given period of time, such as a volatile memory (RAM) within a computer system serving as a server or client in the case in which a program is transmitted via a network such as the Internet or via a communication line such as a telephone line.

The above-noted program may be transferred from a computer system in which the program is stored in a storage apparatus to another computer system, either via a transfer medium, or by a transfer wave in a transfer medium. In this case, the term "transfer medium" transferring a program refers to a medium having a function of transferring information, such as a network (communication network) such as the Internet, or a communication circuit (communication line) such as a telephone line. The above-noted program may be for implementing a part of the above-described functionality. Additionally, it may be a so-called difference file (difference program) enabling a combination with a program that already has recorded the above-noted functionality in a computer system.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

It is apparent that the present invention is not limited to the above embodiments, but may be modified and changed without departing from the scope and spirit of the invention.

What is claimed is:

1. A system comprising:
one or more memories;
   one or more software components stored in the one or more memories; and
   one or more processors, when executing the one or more software components, to cause:
a) a designation information transmitter to at least:
   a-1) identify a transmission destination designated by a transmission destination designation information;
   a-2) recognize whether or not a user identification identifying a user is associated with the transmission destination designation identified;
   a-3) transmit a designation information to the transmission destination in a case that the designation information transmitter recognized that the user identification is associated with the transmission destination designation identified, the designation information comprising an application identification information and a connection destination designation information, the application identification information identifying an application, and the connection destination designation information designating a connection destination from which the application identified by the application identification information is available; and b) an application installer transmitter to at least: b-1) identify an application requested by a download request transmitted from the transmission destination identified by the designation information transmitter; and b-2) transmit the application installer for the application to the transmission destination, the application installer comprising an install function and a storing function, the install function being for installing the application identified by the application identification information, and the storing function being for storing a scheme information, the scheme information being for launching the application identified by the application identification information, the scheme information including a scheme designated by the application identification information, the scheme information defining a correspondence relationship between the scheme and the application launched in accordance with the scheme, and the scheme information defining the launching of the application in accordance with the scheme designated by the application identification information that identifies the application.

2. The system according to claim 1, further comprising: an input unit configured to receive an entry of the transmission destination designation information that designates the transmission destination to which the designation information is to be transmitted, wherein the designation information transmitter is configured to transmit the designation information to the transmission destination designated by the transmission destination designation information which has been entered into the input unit.

3. The system according to claim 2, wherein the input unit is configured as a function of the application.

4. The system according to claim 2, wherein the input unit is configured to receive an entry of a user identification information that identifies a user, the designation information transmitter is configured to transmit the user identification information and the designation information to the transmission destination.

5. The system according to claim 4, further comprising: an application controller of an application server configured to receive a connection request, which comprises the user identification information, from the application which has been launched based on the scheme information at the transmission destination, to which the application installer transmitter had transmitted the application installer.

6. The system according to claim 5, further comprising: a user information storage that stores the user identification information and a user attribute information associated with the user identification information, wherein the application controller is configured to associate a bonus with the attribute information associated with the user identification information, upon receipt of the connection request including the user identification information, wherein the application controller is configured to store, in the user information storage, the bonus, the attribute information and the user identification information in association together with each other.

7. The system according to claim 5, further comprising: a user correspondence relationship storage that stores a first user identification information and a second user identification information in association with each other, the first user identification information for identifying a user, the second user identification information for identifying another user, wherein the application controller is configured to create, upon receipt of the connection request including the first user identification information, the second user identification information associated with the transmission destination, from the application launched based on the scheme information at the transmission destination, to which the application installer transmitter had transmitted the application installer, and wherein the application controller is configured to store the first user identification information and the second user identification information in association with each other in the user correspondence relationship storage.

8. The system according to claim 6, further comprising: a user correspondence relationship storage that stores a first user identification information and a second user identification information in association with each other, the first user identification information for identifying a user, the second user identification information for identifying another user, wherein the application controller is configured to create, upon receipt of the connection request including the first user identification information, the second user identification information associated with the transmission destination, from the application launched based on the scheme information at the transmission destination, to which the application installer transmitter had transmitted the application installer, and wherein the application controller is configured to store the first user identification information and the second user identification information in association with each other in the user correspondence relationship storage.

9. The system according to claim 4, further comprising: a transmission destination designation information storage that stores the user identification information and the transmission destination designation information in association with each other, wherein the designation information transmitter is configured to transmit the designation information in a case that the designation information transmitter recognizes that the user identification entered into the input unit and the transmission designation information are stored in association with each other in the transmission destination designation information storage.

10. The system according to claim 5, further comprising: a transmission destination designation information storage that stores the user identification information and the transmission destination designation information in association with each other, wherein the designation information transmitter is configured to transmit the designation information in a case that the designation information transmitter recognizes that the user identification entered into the input unit and the transmission designation information are stored in association with each other in the transmission destination designation information storage.

11. The system according to claim 6, further comprising: a transmission destination designation information storage that stores the user identification information and the transmission destination designation information in association with each other, wherein the designation information transmitter is configured to transmit the designation information in a case that the designation information transmitter recognizes that the user identification entered into the input unit and the transmission designation information are stored in association with each other in the transmission destination designation information storage.

12. The system according to claim 7, further comprising:
a transmission destination designation information storage that stores the user identification information and the transmission destination designation information in association with each other,
wherein the designation information transmitter is configured to transmit the designation information in a case that the designation information transmitter recognizes that the user identification entered into the input unit and the transmission designation information are stored in association with each other in the transmission destination designation information storage.

13. The system according to claim 8, further comprising:
a transmission destination designation information storage that stores the user identification information and the transmission destination designation information in association with each other,
wherein the designation information transmitter is configured to transmit the designation information in a case that the designation information transmitter recognizes that the user identification entered into the input unit and the transmission designation information are stored in association with each other in the transmission destination designation information storage.

14. The system according to claim 5, further comprising:
an invitation identification information storage that stores the user identification information and an invitation identification information in association with each other, the invitation identification information indicating that the designation information transmitter has transmitted the designation information to a transmission destination designated by the transmission destination designation information,
wherein the designation information transmitter is configured to create, upon entry of the transmission destination designation information into the input unit, the invitation identification information indicating that the designation information transmitter has transmitted the connection destination designation information to a transmission destination designated by the transmission destination designation information,
wherein the designation information transmitter is configured to transmit the invitation identification information and the connection designation information to the transmission destination designated by the transmission destination designation information,
wherein the application controller is configured to associate a bonus with the attribute information associated with the user identification information associated with the invitation identification information, upon receipt of the connection request including the invitation identification information, unless the invitation identification information is stored in the invitation identification information storage.

15. A server comprising:
one or more memories;
one or more software components stored in the one or more memories; and
one or more processors, when executing the one or more software components, to cause:
a) a designation information transmitter to at least:
a-1) identify a transmission destination designated by a transmission destination designation information;
a-2) recognize whether or not a user identification identifying a user is associated with the transmission destination designation identified;
a-3) transmit a designation information to the transmission destination in a case that the designation information transmitter recognized that the user identification is associated with the transmission destination designation identified, the designation information comprising an application identification information and a connection destination designation information, the application identification information identifying an application, and the connection destination designation information designating a connection destination from which the application identified by the application identification information is available; and
b) an application installer transmitter to at least: b-1) identify an application requested by a download request transmitted from the transmission destination identified by the designation information transmitter; and b-2) transmit an application installer to the transmission destination, the application installer comprising an install function and a storing function, the install function being for installing the application identified by the application identification information, and the storing function being for storing a scheme information, the scheme information being for launching the application identified by the application identification information, the scheme information including a scheme designated by the application identification information, the scheme information defining a correspondence relationship between the scheme and the application launched in accordance with the scheme, and the scheme information defining the launching of the application in accordance with the scheme designated by the application identification information that identifies the application.

16. A non-transitory computer-readable storage medium that stores a program, when executed by a computer, to cause the computer to perform a method comprising:
a-1) identifying a transmission destination designated by a transmission destination designation information;
a-2) recognizing whether or not a user identification identifying a user is associated with the transmission destination designation identified;
a-3) transmitting a designation information to the transmission destination in a case that the designation information transmitter recognized that the user identification is associated with the transmission destination designation identified, the designation information comprising an application identification information and a connection destination designation information, the application identification information identifying an application, and the connection destination designation information designating a connection destination from which the application identified by the application identification information is available; and
b-1) identifying an application requested by a download request transmitted from the transmission destination identified by the designation information transmitter; and
b-2) transmitting an application installer to the transmission destination, the application installer comprising an install function and a storing function, the install function being for installing the application identified by the application identification information in the transmission destination, and the storing function being for storing a scheme information in the transmission destination, the scheme information being for launching the application identified by the application identification information, the scheme information including a scheme designated by the application identification information, the scheme information defining a correspondence relationship between the scheme and the application launched in accordance with the scheme, and the scheme information defining the launching of the application in accordance with the scheme designated by the application identification information that identifies the application.

17. An application installer program product stored on at least one non-transitory computer readable medium, wherein the program product is operable when executed by at least one processor, the program product comprising:

an install code for installing an application in a computer, the application being identified by an application identification information and being available from a connection destination designated by a connection destination designation information associated with the application identification information, and a storing code for storing a scheme information in the computer, the scheme information being for launching the application identified by the application identification information, the scheme information including a scheme designated by the application identification information, the scheme information defining a correspondence relationship between the scheme and the application launched in accordance with the scheme, and the scheme information defining the launching of the application in accordance with the scheme designated by the application identification information that identifies the application.

18. A method comprising:
a-1) identifying a transmission destination designated by a transmission destination designation information;
a-2) recognizing whether or not a user identification identifying a user is associated with the transmission destination designation identified;
a-3) transmitting a designation information to the transmission destination in a case that the designation information transmitter recognized that the user identification is associated with the transmission destination designation identified, the designation information comprising an application identification information and a connection destination designation information, the application identification information identifying an application, and the connection destination designation information designating a connection destination from which the application identified by the application identification information is available; and
b-1) identifying an application requested by a download request transmitted from the transmission destination identified by the designation information transmitter; and
b-2) transmitting an application installer to the transmission destination, the application installer comprising an install function and a storing function, the install function being for installing the application identified by the application identification information in the transmission destination, and the storing function being for storing a scheme information in the transmission destination, the scheme information being for launching the application identified by the application identification information, the scheme information including a scheme designated by the application identification information, the scheme information defining a correspondence relationship between the scheme and the application launched in accordance with the scheme, and the scheme information defining the launching of the application in accordance with the scheme designated by the application identification information that identifies the application.

* * * * *